(12) United States Patent
Gierer et al.

(10) Patent No.: US 6,669,309 B1
(45) Date of Patent: Dec. 30, 2003

(54) VIBRATION DAMPER FOR DAMPING FLUID VIBRATIONS IN A HYDRAULIC SYSTEM

(75) Inventors: Georg Gierer, Kressbronn (DE); Willy Holdenried, Immenstaad (DE); Hubert Remmlinger, Friedrichshafen (DE); Karlheinz Mayr, Wasserburg (DE); Herbert Kiebler, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/831,033

(22) PCT Filed: Dec. 3, 1999

(86) PCT No.: PCT/EP99/09492

§ 371 (c)(1),
(2), (4) Date: May 3, 2001

(87) PCT Pub. No.: WO00/34096

PCT Pub. Date: Jun. 15, 2000

(30) Foreign Application Priority Data

Dec. 9, 1998 (DE) .......................................... 198 56 697

(51) Int. Cl.$^7$ .......................... B60T 17/08; F16L 55/04; F16F 3/08
(52) U.S. Cl. ............................. 303/87; 138/30; 267/152
(58) Field of Search ............................. 303/87, DIG. 8; 138/30, 31; 267/152, 153

(56) References Cited

U.S. PATENT DOCUMENTS

| | | | | | |
|---|---|---|---|---|---|
| 3,433,330 A | * | 3/1969 | Murray | ................... | 188/151 R |
| 4,010,940 A | * | 3/1977 | Freyler | ..................... | 188/129 |
| 5,320,203 A | * | 6/1994 | Wilber et al. | ............ | 192/109 F |
| 5,380,074 A | * | 1/1995 | Jones | ......................... | 138/30 |
| 5,540,486 A | * | 7/1996 | Linkner | ................. | 137/565.34 |
| 5,682,923 A | * | 11/1997 | Goloff et al. | ................. | 138/26 |
| 5,720,474 A | * | 2/1998 | Sugiyama | ..................... | 135/75 |
| 5,803,555 A | * | 9/1998 | Schaefer | ...................... | 138/30 |
| 5,967,623 A | * | 10/1999 | Agnew | ......................... | 138/26 |
| 5,992,948 A | * | 11/1999 | Gowda | ...................... | 303/116.1 |
| 6,164,336 A | * | 12/2000 | Pasquet et al. | ................. | 138/26 |

FOREIGN PATENT DOCUMENTS

| DE | 4032875 A1 | * | 4/1992 |
|---|---|---|---|
| DE | 491159 A1 | * | 6/1992 |
| DE | 195 24 921 A1 | | 1/1997 |
| DE | 195 38 615 A1 | | 4/1997 |
| DE | 195 39 779 A1 | | 4/1997 |

* cited by examiner

Primary Examiner—Jack Lavinder
Assistant Examiner—Xuan Lan Nguyen
(74) Attorney, Agent, or Firm—Davis & Bujold PLLC

(57) ABSTRACT

The invention relates to a vibration damper for damping fluid vibrations in a hydraulic system, especially in a hydraulic control circuit for a motor vehicle gear box with an elastically deformable damper element (31), According to the invention, the vibration damper is provided with a separate sealing element (32) which guarantees the functioning of the hydraulic system in the event of a breakdown e.g. the damper element (31) bursting.

11 Claims, 2 Drawing Sheets

VIBRATION DAMPER FOR DAMPING FLUID VIBRATIONS IN A HYDRAULIC SYSTEM

FIELD OF THE INVENTION

Figure 1:
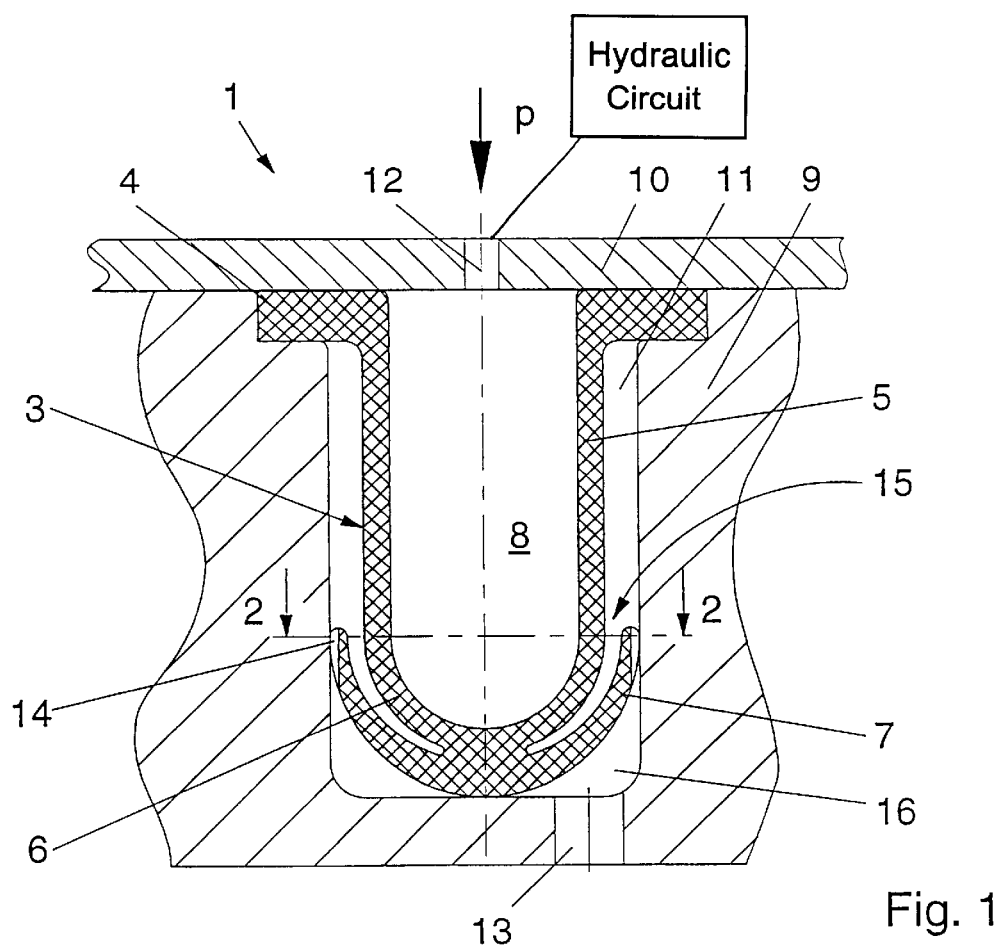

The invention concerns a vibration damper for the damping of fluid vibrations in a hydraulic system, especially in a hydraulic control circuit for a motor vehicle transmission wherein said vibration damper possesses an elastic, deformable damping element.

BACKGROUND OF THE INVENTION

Vibration dampers of the above kind are installed in motor vehicle transmissions for the adjustment of the control pressure in the valves as well as for the damping of vibratory oscillations in the fluid pressure medium. The damping elements are customarily made of an elastomer and thus are elastically deformable upon changes in load from different fluid pressures.

DE 195 24 921 A1, for instance, discloses such a vibration damper. This patent teaches of a vibration damper with a membrane, which is constructed from an elastomer as a component in the form of a hollow cylinder. The failure of an elastomer membrane of this nature, for instance by leakage because of bursting, leads, generally, to the failure of the entire vibration damper. Because of this, the controlling pressure in the hydraulic system drops and the transmission is no longer controllable. This leads to contingent damage to the transmission and can finally result in the immobilization of the vehicle.

SUMMARY OF THE INVENTION

Thus, the purpose of the invention is to prevent a pressure loss at a vibration damper upon failure of the damping element, so that a transmission failure with contingent immobilization of the vehicle is avoided.

This purpose is achieved, by a generic vibration damper, wherein a sealing element is provided, which secures the function of the hydraulic system upon a failure of the damping element, for instance by leakage because of bursting. In this way, advantageously, a free fluid through-flow action is blocked, so that upon a failure of the damping element a pressure drop in the hydraulic control circuit is prevented. Even in the case of a defective damping element, the function of the transmission remains essentially in force and an immobilization of the vehicle is avoided. If a possible difficulty in shifting quality appears, which can occur from a burst damping element, then as a matter of course, the damping element is to be replaced.

A preferred embodiment of the invention offers the proposition, that the damping element be placed in a recess of a housing, further, that this housing possess an opening, in particular, an orifice to serve as the inlet of a pressurized fluid to the damping element. In addition, a pressure equalization port in said housing is provided. With this arrangement, advantageously, the sealing element, in case of failure of the elastically deformable damping element, closes the pressure compensation opening. Thus, a solution is brought about, by which, during normal operation of the vibration damper, when the damping element exhibits no leakage, the vibrations of the fluid pressure are damped by elastic deformation and the pressure compensation opening is held open, so that a pressure equalization in two chambers before and after the said sealing element takes place and that, by means of the extenuation of the damping element, volumes of air compressed in the forward chamber escape through the pressure equalizing opening. As this happens, the chambers are defined before and after the sealing element, regarded in the direction of the flow from the throttle valve to the pressure equalizing opening.

In a further development, the proposal is made that the sealing element and/or the damping element be movably placed in the recess. In this way, several advantageous possibilities arise in the formulation of the two essential elements of the vibration damper.

In one advantageous design of the invention, it is proposed, that the pressure side orifice and the pressure equalization port be respectively placed in essentially oppositely situated end locations of the recess and that the sealing element be provided near to the orifice and the damping element be placed near to the pressure equalization port.

A particularly advantageous design of the vibration damper is found, wherein the sealing element is constructed as essentially a cylindrical piston, and the recess in the housing is bored as a piston boring in which the said piston is guided to be axially displaceable. In this arrangement, the cylindrical outer shell of the piston sealingly contacts the cylindrical inner wall of the piston boring, so that the two fluid chambers, located forward and after the two ends of the piston, are separated, one from the other.

In another development of the invention, the piston, on at least one end, is provided with a conically shaped boring, which serves to center the damping element.

The damping element itself is constructed as a sphere, wherein the diameter of the sphere is less than the diameter of the piston or the piston boring. In this way, the sphere is advantageously centered within said conically shaped boring at one end of the piston.

The piston, as well as the housing which encloses it, is comprised of materials with essentially equal heat expansion coefficients, so that by any possible heating of the vibration damper, the sealing function between the piston and the piston boring is advantageously assured.

The piston is advantageously made of a plastic, especially Ryton© or a similar construction material. The housing can be fabricated of aluminum or equal material.

The damping element, on the other hand, is made of an elastomer, especially nitrile butadiene rubber (NBR) or a similar raw material, and possesses accordingly, an advantageous damping characteristic.

In a further embodiment of the invention, the proposal is to place the damping element close to the orifice and the sealing element close to the pressure equalization port of the recess. In this way, advantageously, an arrangement is undertaken opposite to that of the previously described design with an reversed positioning of the two elements.

It is advantageous, if the damping element is designed as an essentially hollow cylindrical and elastically deformable component, and provided with one essentially open and one essentially closed end piece for the acceptance of the fluid in the internal chamber of the damping element.

The sealing element is essentially shaped as a circular plate, an annular ring, a plate, a cone, as a cup, or is a similarly shaped component and is placed preferably on the outside of the closed end of the damping element.

By the construction of the sealing element in a conical or cup shaped form, the said element opens favorably in the direction of the open end of the damping element and thus toward the orifice, so that in a case of the bursting of the damper element, and an escape of the pressurized fluid out of the damper element, an effective sealing function is accomplished by the sealing element.

In an additional development, the sealing element exhibits on its outer radial rim, a lip seal running essentially around its circumference. During normal operation of the damping element, this lip seal lies nearly completely against the inner wall of the recess, thereby dividing the recess into chambers, one forward and one after the said lip seal, as seen in the direction of the flow.

In a further design of the sealing element, the lip seal is shaped elliptically, so that it forms, within the predominately cylindrical construction of the inner wall of the recess, escape penetrations of specifically designed opening between the lip seal and the said inner wall.

In yet another, embodiment of the sealing element, especially to be preferred, the sealing element is essentially annular in shape and the diameter of the lip seal is, when not installed, greater than that of the inside diameter of the essentially cylindrical recess. By this means, assurance is given, that the lip seal, when installed, will lay stressed against the said inner wall of the recess.

So that a pressure exchange of the two chambers of the recess, before and after the lip seal, can be brought about, this seal is provided with at least one through opening.

The said through opening is advantageously so designed and the elasticity of the lip seal is selected in such a manner, that in the case of failure, for instance by bursting of the damping element, by means of which failure, due to the unilateral force of the existing fluid pressure in the chamber forward of the lip seal, a circumferential seal is formed by the said lip seal against the inner wall of the recess which encompasses the damper.

In this way, a simple solution is proposed, which assures, that after the bursting of the damper element, the lip seal is reliably pressed against the inner wall of the recess, and thereby closes the pressure equalization port. The efficiency of the damping is indeed lost to a considerable degree, however, the control pressure in the vibration damper does not lead directly to loss of function by the transmission.

In a further preferred embodiment of the invention, the sealing element is designed as an elastic, essentially circular, annular plate and is connected coaxially with the damping element.

When this is done, the sealing element is shaped in such a way, that it does not directly touch the inner wall of the recess during the normal operation of the vibration damper, so that the chamber forward of the sealing element communicates with a chamber behind the sealing element. With this arrangement, under normal operational conditions, a pressure equalization is effected between the two chambers before and after the sealing element with the result that upon the expansion of the damping element, the volumes of air pressed out of the forward chamber advantageously escape through the said pressure equalization port to the after chamber.

The sealing element itself, as well as the connecting of the sealing element onto the damping element is carried out in such a manner, that the sealing element, in case of failure, closes off the pressure equalization port. This can be effected, for instance, since the centralized and essentially neck shaped connection piece between the damping element and the sealing element is so elongated by the fluid pressure on the one side of the sealing element, that the said sealing element is pressed against a sealing seat of the recess.

Advantageously, the sealing element is designed to be flexible, so that it is elastically deformed in its radial, outward area by the fluid pressure on one side and is thus pressed against an annular sealing seat of the recess, thus closing the pressure equalization port.

The sealing element as well as the damping element are constructed as separate components. Thus, the exchange of a single defective component as well as the separate fabrication of the two components in different constructive materials becomes simple to do, so that each component can be made as a sealing element or a damper element from the most appropriate materials.

However, as an alternative, the sealing element and the damping element can be made in one-piece construction, for instance, from an elastomer. Such a one-piece proposal offers an especially economical production of the sealing element and the damping element.

BRIEF DESCRIPTION OF THE DRAWING(S)

Figure 2:
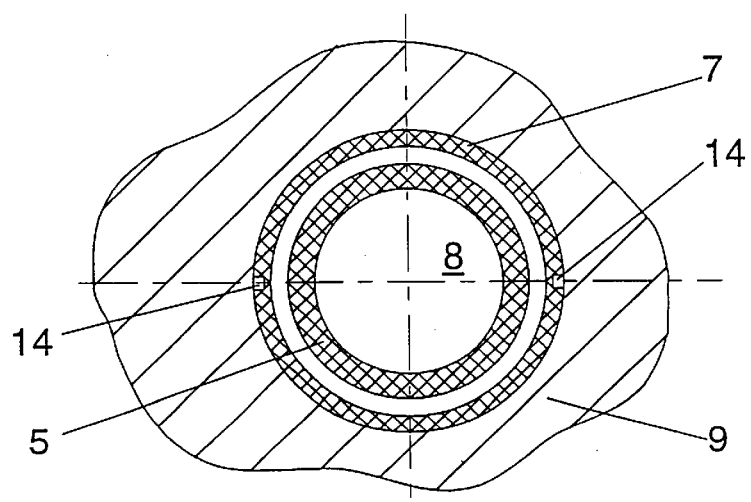
Figure 3:
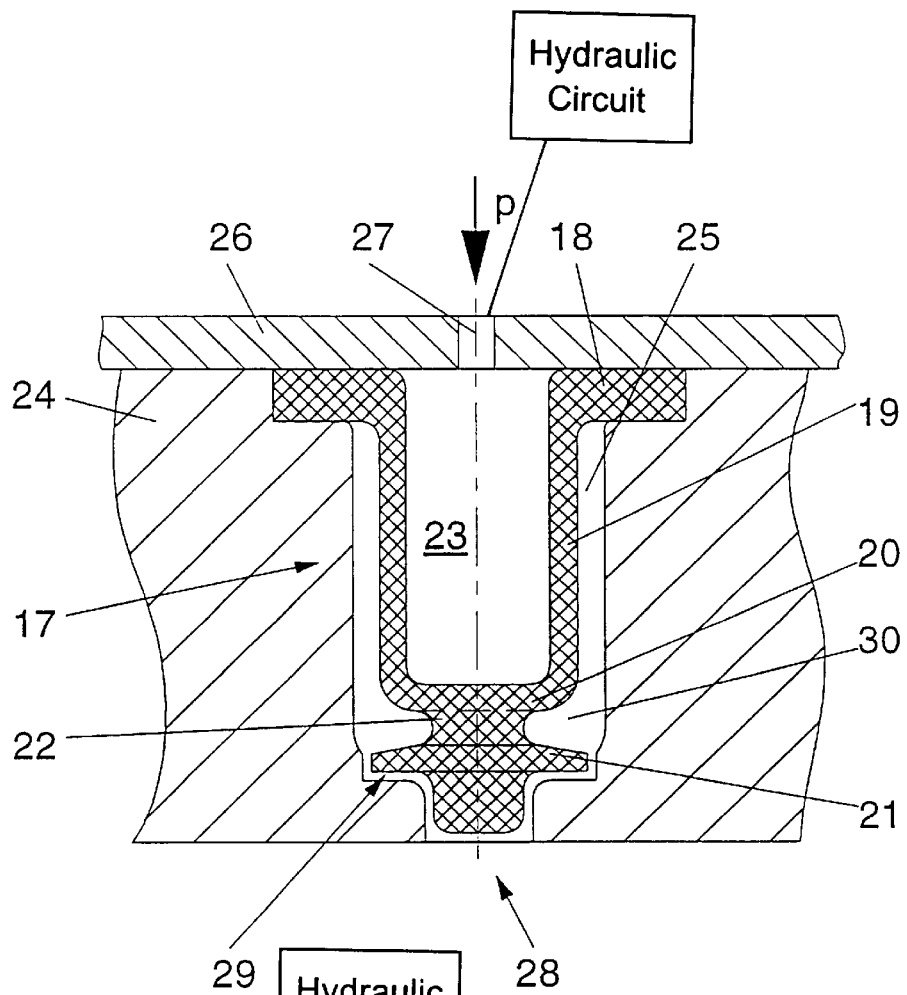
Figure 4:
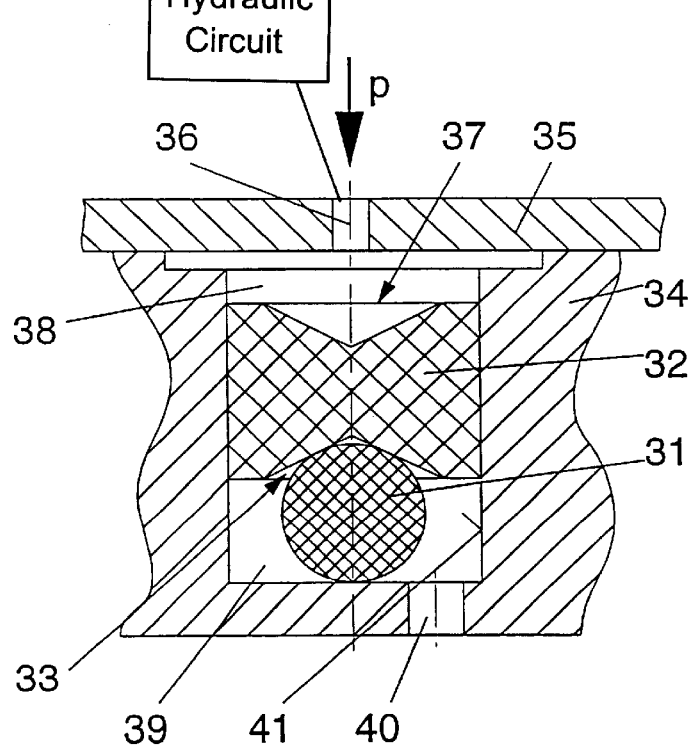

Further goals, features, advantages and application possibilities of the invention arise in the following explanation of an embodiment, which is presented in more detail with the aid of the drawings. In this explanation, all described and/or illustratively presented features, form the object of the invention, of themselves alone, or in optional, reasonable combination, independently of their summations in the claims and their inter-claim relations. There is shown in:

FIG. 1 a vibration damper with an essentially hollow cylinder shaped damping element in longitudinal section, FIG. 2 a vibration damper conforming to FIG. 1 in cross-section through line 2—2 of said figure, FIG. 3 a vibration damper similar to the presentation of FIG. 1, however alternative in that a plate shaped sealing element is presented in longitudinal section, and FIG. 4 a vibration damper in an alternative design, with a sealing piston as well as a spherical shaped damping element.

DETAILED DESCRIPTION OF THE INVENTION

A first embodiment of a vibration damper 1 (FIGS. 1, 2) comprises in general a damper element 3 with a sealing element 7 which is inserted into a recess 11 of a housing 9, for instance, of a motor vehicle transmission. The damping element 3 is formed by an essentially hollow, cylindrical midsection 5, which, on its open end is provided with an annular flange projection 4 which is fixed in place within the housing 9 by a cover plate 10. The opposite end the damping element 3 exhibits an essentially cup shaped, closed bottom 6 and thus defines a somewhat cylindrical inner chamber 8 of the damping element 3. On the outer side of the bottom 6 is provided a generally cup shaped sealing element 7, which is centrally connected with the damping element 3.

The damper element 3 is inserted into the recess 11 at a radial spatial interval from the inner wall thereof. The sealing element 7, especially with its radially disposed outer lip seal lies against the inner wall of the recess 11. In the said cover plate 10 is provided an opening, for example, this being in the form of a restrictive orifice 12, in order to bring into the inner chamber 8 of the damping element 3 the pressurized fluid at pressure p. On the opposite end of the recess 11, as seen in the direction of flow, is provided a pressure equalization port 13, this being for instance in the form of a boring. During normal operation of the damper element 3 and under an increase in the pressure of the fluid in the inner chamber 8 of the damper element 3, the elastically deformable midsection 5 of the damping element 3 extends itself outwardly, thus reducing the volume of the forward air chamber 15 above the sealing element 7. The volumes so expressed out of this forward chamber 15 are forced through the two radially outer escape openings 14 in the lip seal 7 into the after chamber 16 underneath the said lip seal. By this action, a pressure equalization between the two chambers 15, 16 is effected, whereby the after chamber 16 communicates with the atmospheric ambience. The said escape openings 14 are, as an example, situated diametrically opposed to one another in the sealing element 7.

If, now, in a case of failure, for instance the wall of the midsection 5 of the damping element 3 tears or bursts, and the pressurized fluid discharges into the forward chamber 15 above the sealing element 7, then, through the two, small dimensioned escape openings, 14 of the lip seal, a turbulent flow arises, which results in a compression of the lip seal against the inner wall of the recess 11. First, the damping action is largely lost by this flow blocking action, however, second, the control pressure is retained in the inner chamber 8 of the damping element 3, and thus also in the therewith connected hydraulic control circuit, so that a transmission functional failure is advantageously avoided.

In an alternative construction, (FIG. 3) the damping element 17 with its projecting flange 18, along with the mid-section 19 and the bottom 20 follow essentially the presentation in FIG. 1. This damping element 17 is inserted into a recess 25 of a housing 24, whereby the recess 25 is provided on one of its ends with a cover plate 26 having an orifice 27. On the opposite end of said recess 25, is a pressure equalizing port 28.

The principal difference in the design according to FIG. 3 from the design depicted in FIG. 1 lies therein, that the sealing element 21 is made as a generally circular disk shaped plate which, by means of a centrally located neck 22 is affixed to the bottom 20 of the damping element 17. The sealing element 21 is, in this construction, so designed, that, when inserted in recess 25, it possesses a circumferentially running opening 29 between the sealing element 21 and the inner wall of the recess 25, which remains open during normal operation of the damping element 17, i.e. when there is no leakage occurring from the mid-sectiorn 19. In this way, an equalization of pressure between forward chamber 30 above the sealing element 21 and the pressure equalization port 28 is established. In the case of failure, for instance by the bursting of the mid-section 19 of the damping element 17, a pressure increase occurs in forward chamber 30, whereby the radial, outward projecting annular area of the sealing element 21 is sealingly compressed against a matching annular, seating surface of the recess 25 of the housing 24. By this means, the inner chamber 23 of the damping element 17, that is to say, also the chamber 30, is thus closed off against the ambient atmosphere. The damping action of the damping element 17 is indeed lost, however, the controlling pressure is retained in the hydraulic control circuit, whereby a contingent failure of the transmission is prevented.

In a further alternative construction (FIG. 4) the proposal is, that the sealing element is to be designed as essentially a cylindrical piston 32, which sealingly makes contact with the inner wall of the piston boring 41 in the housing 34. The piston 32 is loaded by pressure on the one side by the orifice 36 in the housing cover plate 35, so, that the piston moves itself within the recess 37 in the direction of the pressure equalization port 40, wherein the pressure equalization port 40 is located on the end of the recess 37 opposite from the orifice 36.

In the after chamber 39, which, seen in the direction of flow, is found behind the piston 32, is placed an elastic deformable sphere. This is centered by a conical boring 33 on one end of the piston 32. By means of the pressure application of the chamber 38, which, as seen in direction of flow, is placed on the front of the piston 32, the damping element 31 is compressed, dependent upon the increasing fluid pressure. The air volumes pressed out of the chamber 39, can escape through the pressure equalization port 40 from the housing 34.

The piston 32, as well as the housing 34 which encompasses it, are advantageously made of raw materials with closely equal heat expansion coefficients. That is to say, that the piston is made of a plastic, in particular Ryton © and the housing is constructed of aluminum, so that upon a heating of the vibration damper, the piston 32 remains in a sealing contact against the piston boring 41. The spherical damping element 31 is advantageously fabricated from an elastomeric raw material, especially from NBR. In a possible case of failure of the damping element, wherein, for example, the elastomer material cracks or bursts, then, first the damping action will be lost, second, however, by means of the piston 32 at any time a sealing function of the vibration damper is assured, so that here again, the control pressure in the hydraulic circuit can be maintained and a contingent transmission failure is avoided.

What is claimed is:

1. A vibration damper for the damping of vibrations of fluid in a hydraulic circuit, the vibration damper comprising:
   a housing (34);
   a recess (11, 25, 37) formed in the housing;
   an opening (12, 27, 36) formed in the housing for allowing passage of pressurized fluid therethrough from a hydraulic circuit, communicating with the vibration damper, into the recess (11, 25, 37) and passage from the recess (11, 25, 37) to the hydraulic circuit;
   a pressure equalization port (13, 28, 40) formed in the housing and communicating with the recess (11, 25, 37); and
   a sealing element (32) and an elastomeric elastically deformable damping element (31) located within recess (11, 25, 37) between the opening and the pressure equalization port, the sealing element (32) having a centrally located boring which partially receives and centers the damping element (31) within the recess (11, 25, 37) and the pressure equalization port (13, 28, 40) is spaced from the sealing element (32) so that the pressure equalization port (13, 28, 40) is unobstructed by the sealing element (32) during normal operation;
   wherein, upon failure of the damping element, the sealing element closes the pressure equalization port to assure continued functioning of the hydraulic circuit.

2. The vibration damper in accordance with claim 1, wherein the opening for allowing passage of the pressurized fluid to a front face of the damping element (3, 17, 31) is an unobstructed orifice (12, 27, 36) and a front face of the sealing element (32) is spaced from an inwardly facing surface of the housing (34) so that the housing and the sealing element (32) define an interior chamber (8, 23, 38) therebetween for accommodating the pressurized fluid.

3. The vibration damper in accordance with claim 2, wherein at least one of the sealing element (7, 21, 32) and the damping element (3, 17, 31) is movably located within the recess (11, 25, 37) and a central region of the front face of the sealing element (7, 21, 32) is continuously spaced from the unobstructed orifice (12, 27, 36).

4. The vibration damper in accordance with claim 1, wherein the opening (12, 27, 36) for allowing passage of the pressurized fluid and the pressure equalization port (13, 28, 40) are located at opposite ends of the recess (11, 25, 37) and the sealing element (32) is located adjacent and faces the opening (12, 27, 36) for allowing passage of the pressurized fluid and the damping element (31) is located adjacent the pressure equalization port (40).

5. The vibration damper in accordance with claim 1, wherein the sealing element is a cylindrical piston (32) and the recess (37) is constructed as a piston boring (41) and the cylindrical piston (32) is axially displaceably guided within the piston boring (41) and a cylindrical outer surface of the cylindrical piston (32) is in sealing contact with an inner wall of the piston boring (41).

6. The vibration damper in accordance with claim 5, wherein a surface of the damping element (31) which abuts against the housing (34) is generally spherical in shape.

7. The vibration damper in accordance with claim 5, wherein at least a portion of the damping element (31) which abuts with the housing (34) is solid and spherical in shape and the spherical portion of the damping element (31) has a diameter which is less than a diameter of the piston (32) and less than a diameter of the piston boring (41).

8. The vibration damper in accordance with claim 5, wherein the cylindrical piston (32) and the housing (34) are manufacture from materials which have substantially equal coefficients of expansion.

9. The vibration damper in accordance with claim 8 wherein cylindrical piston (32) is manufacture from a plastic and the housing (34) is manufactured from aluminum.

10. The vibration damper in accordance with claim 1, wherein the housing (34) is manufactured from aluminum.

11. The vibration damper in accordance with claim 1, wherein the sealing element (32) and the damping element (31) are two separate components.

* * * * *